United States Patent
Takiguchi

(10) Patent No.: US 7,469,127 B2
(45) Date of Patent: Dec. 23, 2008

(54) NONCONTACT INFORMATION CARRIER READER AND METHOD OF READING INFORMATION STORED IN A NONCONTACT INFORMATION CARRIER

(75) Inventor: Masahiro Takiguchi, Anjo (JP)

(73) Assignee: Denso Wave Incorporated, Tokyo (JP)

( * ) Notice: Subject to any disclaimer, the term of this patent is extended or adjusted under 35 U.S.C. 154(b) by 431 days.

(21) Appl. No.: 11/217,510

(22) Filed: Sep. 2, 2005

(65) Prior Publication Data

US 2006/0049918 A1    Mar. 9, 2006

(30) Foreign Application Priority Data

Sep. 3, 2004    (JP) ............................. 2004-257136

(51) Int. Cl.
 *H04B 5/00* (2006.01)
 *H04Q 7/20* (2006.01)
(52) U.S. Cl. ...................... 455/41.1; 235/439; 340/10.1
(58) Field of Classification Search ................ 455/41.1, 455/250.1; 340/10.1, 10.3, 10.4; 235/439, 235/451

See application file for complete search history.

(56) References Cited

U.S. PATENT DOCUMENTS

2007/0001008 A1*    1/2007 Steffen ....................... 235/451

FOREIGN PATENT DOCUMENTS

| JP | A-S58-050804 | 3/1983 |
| JP | A-H08-139549 | 5/1996 |
| JP | 11-298366 | 10/1999 |
| JP | A-2003-188741 | 7/2003 |
| JP | A-2003-298400 | 10/2003 |
| JP | A-2003-304174 | 10/2003 |
| JP | A-2004-070804 | 3/2004 |

OTHER PUBLICATIONS

Office Action dated Oct. 7, 2008 in corresponding Japanese patent application No. 2004-257136 (and English translation).

* cited by examiner

*Primary Examiner*—Lee Nguyen
(74) *Attorney, Agent, or Firm*—Posz Law Group, PLC

(57) ABSTRACT

In a noncontact information carrier reader, a receiving unit receives a response wave transmitted from a noncontact information carrier. The response wave is generated by modulating the carrier wave based on a response signal. An amplifying unit amplifies carrier wave components contained in the received response wave based on a first gain, and amplifies response signal components contained in the received response wave based on a second gain. The second gain is higher than the first gain. A synchronized-detection demodulator demodulates the response signal components contained in the response wave by mixing the transmitted carrier wave and the response wave amplified by the amplifying unit.

8 Claims, 10 Drawing Sheets fc: FREQUENCY OF CARRIER WAVE
fl_s, fu_s: FREQUENCIES OF SUBCARRIER WAVES
fk1, fk2, fm1, fm2: FREQUENCIES OF RESPONSE SIGNAL fc: FREQUENCY OF CARRIER WAVE
fl_s, fu_s: FREQUENCIES OF SUBCARRIER WAVES
fk1, fk2, fm1, fm2: FREQUENCIES OF RESPONSE SIGNAL fc: FREQUENCY OF CARRIER WAVE
fl_s, fu_s: FREQUENCIES OF SUBCARRIER WAVES
fk1, fk2, fm1, fm2: FREQUENCIES OF RESPONSE SIGNAL

NONCONTACT INFORMATION CARRIER READER AND METHOD OF READING INFORMATION STORED IN A NONCONTACT INFORMATION CARRIER

CROSS REFERENCE TO RELATED APPLICATION

This application is based on Japanese Patent Application 2004-257136 filed on Sep. 3, 2004, so that the descriptions of which are all incorporated herein by reference.

BACKGROUND OF THE INVENTION

1. Field of the Invention

The present invention relates to readers and methods for reading data stored in a noncontact (contactless) information carrier. More particularly, the present invention relates to readers and methods for reading data stored in a noncontact information carrier, which are capable of transmitting a radio frequency carrier wave to the noncontact information carrier. The readers and methods are also capable of receiving a response wave, which is generated by modulating the carrier wave based on the data stored in the noncontact information carrier and is transmitted therefrom, to demodulate the data from the received response wave.

2. Description of the Related Art

Noncontact communication tag systems are designed such that a carrier wave (high frequency radio wave) transmitted from a tag reader (tag reader / writer) to noncontact information tags allows power supply to the tags and radio communications between the tag reader and the tags.

Recently, in such noncontact communication tag systems, it has been desirable to increase the amplitude (output level) of the carrier wave and/or the receiving sensitivity of the tag reader for meeting the needs of users who want to enhance a communicable distance between a tag reader and each tag.

Envelope-detection demodulators each with a simple circuit structure had been adopted in tag readers, but recently synchronized-detection demodulators have been provided in tag readers for increasing the receiving sensitivities thereof.

Increase of the output level (amplitude) of a carrier wave causes the level (amplitude) of a response wave, which is transmitted from a noncontact information tag in response to the carrier wave and received by a tag reader, to increase. For this reason, if installing a synchronized-detection demodulator in a tag reader, it is necessary to limit the level of the response wave before being received by the synchronized-detection demodulator within a predetermined range that allows the response wave to be processable by the synchronized-detection demodulator.

On the other hand, Japanese Unexamined Patent Publication No. H11-298366 discloses a noncontact ID (identification) tag system. In a conventional noncontact ID tag system disclosed in the publication, increase of the gains of receiving amplifiers of a tag reader, which are operative to receive a demodulated baseband signal, for sufficiently amplifying a response wave transmitted form a tag may cause the receiving amplifiers to be saturated while the tag reader transmits a query signal (amplitude-modulated carrier wave) through the receiving amplifiers.

In the publication, for preventing the receiving amplifiers from being saturated even when increasing the gains thereof, a tag reader is designed such that the input lines of the receiving amplifiers are electrically connected to the ground through attenuators, such as resistors, and switches, respectively. While a query signal is transmitted from the tag reader except when a response wave is received thereby, the switches are kept closed to allow the query signal to be attenuated. This makes it possible to prevent the receiving amplifiers from being saturated even when increasing the gains thereof.

FIG. 9 shows the structure of a noncontact tag reader that uses the conventional feature in the Publication for avoiding the limitation of the level of a response wave before being received by a synchronized-detection-demodulator.

Specifically, as illustrated in FIG. 9, when a control circuit 2 of a tag reader (querier) 1 sends a modulated carrier wave to a tag 5 through a transmitting circuit 3 and an antenna 4, an antenna of the tag 5 receives the modulated carrier wave to capture power based on the received carrier wave and data modulated therein. The captured power allows the tag 5 to operate, so that the tag 5 modulates the carrier wave using load modulation. That is, the tag 5 modulates the received carrier wave at, for example, a feeding point of the antenna thereof based on a response signal (baseband signal) corresponding to the captured data modulated in the carrier wave. The tag 5 reflects the modulated carrier wave as a response wave to the tag reader 1.

The tag reader 1 receives the response wave sent from the tag 5 through the antenna 4 so that an attenuator 6 thereof attenuates the response wave, and a synchronized-detection demodulator of a receiving circuit 7 of the tag reader 1 demodulates the response signal from the attenuated response wave. A receiving amplifier of the receiving circuit 7 amplifies the response signal, thereby sending it to the control circuit 2.

Specifically, in the contactless tag system illustrated in FIG. 9, the attenuator 6 needs to constantly attenuate the response wave because attenuation of the magnitude of the maximum amplitude (maximum peak-to-peak) of the response wave is required for preventing saturation of the receiving amplifier.

Note that FIG. 10A illustrates an example of the waveform W1 of the response wave before being received by the attenuator 6 when the tag 5 modulates the carrier wave using subcarrier load modulation. FIG. 10A also illustrates an example of the waveform W2 of the response wave output from the attenuator 6 when the tag 5 modulates the carrier wave using subcarrier load modulation.

In addition, FIG. 10B illustrates the frequency spectrum FS1 of the waveform W1 of the response wave, and the frequency spectrum FS2 of the waveform W2 thereof. FIG. 10C illustrates the envelope EV1 of the waveform W1 of the response wave, and the envelope EV2 of the waveform W2 thereof.

In the structure of the tag reader 1 illustrated in FIG. 9, the level (peak-to-peak) of each carrier wave component contained in the response wave decreases with decrease of the level (peak-to-peak) of each response signal component contained in the response wave (see FIG. 10A). This may cause the receiving sensitivity of the receiving circuit 7 to the response signal to be reduced depending on the decrease of the response wave's level.

Specifically, in FIGS. 10A and 10B, the attenuator 6 attenuates the peak-to-peak of the response wave so as to limit it within a receivable signal range $V_T$ that allows the response wave to be receivable by the synchronized-detection demodulator of the receiving circuit 7. In other words, as illustrated in FIG. 10B, the attenuator 6 attenuates the level (amplitude) of the response wave so as to limit it to be lower than a receivable signal level $V_L$, which corresponds to the receivable signal range $V_T$, and allows the response wave to be receivable by the synchronized-detection demodulator of the receiving circuit 7.

As described above, when the tag 5 uses load modulation to modulate the amplitude of the waveform of the carrier wave, the response signal components are contained in the envelope of the response wave.

As illustrated in FIG. 10C, therefore, attenuation of the level (amplitude) of the response wave by the attenuator 6 causes the envelope EV1 of the waveform W1 to change into the envelope EV2 of the waveform W2 such that the level (peak-to-peak) of each response signal component contained in the response wave drops.

As described above, in the structure of the tag reader 1 illustrated in FIG. 9, decrease of the receiving sensitivity of the receiving circuit 7 to the response wave depending on the decrease of the response wave's level may make it difficult to enhance a communicable distance between the tag reader 1 and the tag 5. In particular, if the receiving circuit 7 is designed as an IC (Integrated Circuit) in order to downsize the tag reader 1, the receivable signal range $V_T$ of the integrated receiving circuit 7 may be more narrowed as compared with a non-integrated receiving circuit 7. This may raise the need of increasing the attenuation ratio of the attenuator 6, but increase of the attenuation ratio thereof may cause the sensitivity of the integrated receiving circuit 7 to decrease more.

SUMMARY OF THE INVENTION

The present invention has been made on the background above. Specifically, at least one preferable embodiment of the present invention provides a noncontact information carrier reader and method of reading information stored in a noncontact information carrier, which is capable of selectively attenuating a carrier wave component contained in a response wave transmitted from a noncontact information carrier.

According to one aspect of the present invention, there is provided a noncontact information carrier reader for transmitting a carrier wave to a noncontact information carrier. The noncontact information carrier reader includes a receiving unit configured to receive a response wave transmitted from the noncontact information carrier. The response wave is generated by modulating the carrier wave based on a response signal in the noncontact information carrier. The noncontact information carrier reader also includes an amplifying unit configured to amplify carrier wave components contained in the received response wave based on a first gain and to amplify response signal components contained in the received response wave based on a second gain, thereby outputting the amplified response signal. The second gain is higher than the first gain. The noncontact information carrier reader further includes a synchronized-detection demodulator configured to demodulate the response signal components contained in the response wave by mixing the transmitted carrier wave and the response wave amplified by the amplifying unit.

According to another aspect of the present invention, there is provided a method of reading a response data stored in a noncontact information carrier. The method includes transmitting a carrier wave to a noncontact information carrier, and receiving a response wave transmitted from the noncontact information carrier. The response wave is generated by modulating the carrier wave based on a response signal in the noncontact information carrier. The method also includes amplifying carrier wave components contained in the received response wave based on a first gain, and amplifying response signal components contained in the received response wave based on a second gain. The second gain is higher than the first gain. The method further includes demodulating the response signal components contained in the response wave by mixing the transmitted carrier wave and the response wave amplified by the amplifications.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

First Embodiment

A first embodiment of the present invention will be described hereinafter with reference to FIGS. 1 to 3C.

Figure 1:
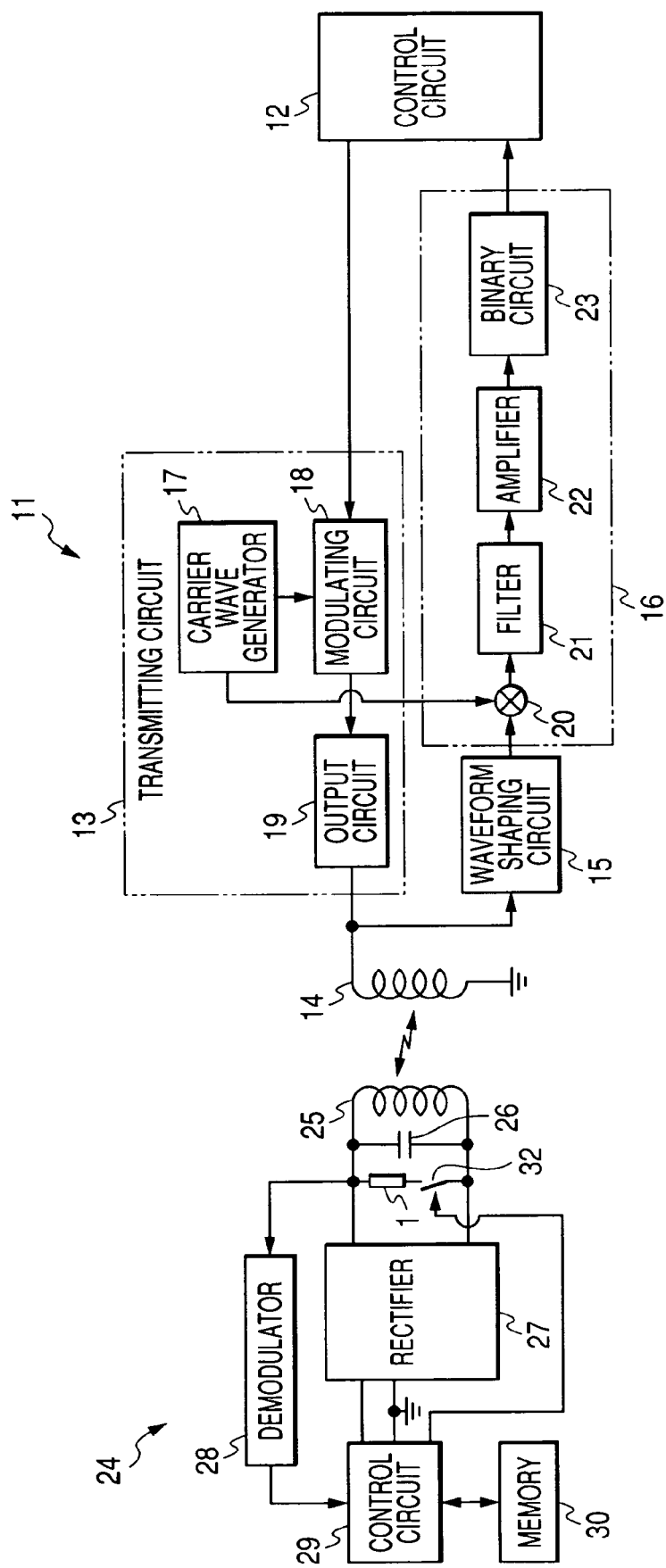
FIG. 1 is a block diagram schematically illustrating an example of the functional configuration of a noncontact communication tag and that of a reader / writer according to a first embodiment of the present invention.

FIG. 1 illustrates an example of the functional configuration of a noncontact communication tag 24 and that of a tag reader / writer (tag reader) 11 according to the first embodiment of the present invention. The noncontact communication tag is referred to simply as "RF (Radio Frequency) tag" hereinafter.

As illustrated in FIG. 1, the reader/writer 11 is provided with a control circuit 12 composed of, for example, a programmed microcomputer, a transmitting circuit 13, an antenna 14, a waveform shaping circuit 15, and a receiving circuit 16. The transmitting circuit 13 and the receiving circuit 16 are electrically connected to the control circuit 12, and the receiving circuit 16 is electrically connected to the waveform shaping circuit 16. The antenna 14 is electrically connected to both the transmitting circuit 13 and the waveform shaping circuit 15.

The transmitting circuit 13 includes a carrier wave generator 17, a modulating circuit 18, and an output circuit 19. The modulating circuit 18 is electrically connected to the control circuit 12, the carrier wave generator 18, and the output circuit 19. The output circuit 19 is electrically connected to both the antenna 14 and the waveform receiving circuit 15.

The receiving circuit 16 is designed as, for example, an IC operating on, for example, 3.3 V.

Specifically, the receiving circuit 16 includes a mixer 20, a filter 21, an amplifier 22, and a binary circuit 23. The mixer 20 is electrically connected to both the carrier wave generator 17 and the waveform shaping circuit 15. The mixer 20 is also electrically connected to the filter 21. The filter 21, the amplifier 22, and the binary circuit 23 are electrically connected to each other in this order. The binary circuit 23 is electrically connected to the computer circuit 12.

The carrier wave generator 17 is operative to generate a radio frequency carrier wave, such as a sinusoidal wave, and to supply it to the modulating circuit 18 and the receiving circuit 16. The control circuit 12 is operative to send, to the modulating circuit 18, data including, for example, at least one command with respect to the RF tag 24. The modulating circuit 18 is operative to modulate the supplied carrier wave based on the data sent from the control circuit 12. The output circuit 19 has functions of receiving the modulated carrier wave and of amplifying the modulated carrier wave at a variable gain. The output circuit 19 has another function of radiating the amplified modulated-carrier wave from the antenna 14.

Note that, in the first embodiment, the modulated carrier wave radiated from the antenna 14 has a peak-to-peak amplitude $V_R$, which may equal to or exceed, for example, 20 V (20 $V_{p-p}$).

As illustrated in FIG. 1, the RF tag 24 is provided with an antenna 25, a capacitor 26, a rectifier 27, a synchronized-detection demodulator 28, a control circuit 29 composed of, for example, a programmed microcomputer, and a nonvolatile memory 30. In addition, the RF tag 24 is provided with a resistor 31 and a switch 32, such as a semiconductor switch.

The capacitor 26 is electrically connected to the antenna 26 in parallel thereto. The resistor 31 and the switch 32 are electrically connected to each other in series, and the set of resistor 31 and switch 32 is electrically connected to the capacitor 26 and the antenna 25 in parallel thereto. The switch 32 has a control terminal (not shown) that is electrically connected to the control circuit 29. The control circuit 29 is operative to send control signals to the control terminal of the switch 32; these control signals allow the switch 32 to open and close. The rectifier 27 is electrically connected to the antenna 25 in series.

Both ends of the series circuit of the resistor 31 and the switch 32 are electrically connected to the demodulator 28 so that the voltage across the series circuit of the resistor 31 and the switch 32 is drawn out to be applied to the demodulator 28. The demodulator 28 is electrically connected to the control circuit 29, and the control circuit 29 is electrically connected to both the memory 30 and the rectifier 27. The memory 30 has stored therein, for example, a plurality of items of data (response data).

Specifically, when the tag 24 is located at a position within an area where the carrier wave radiated from the antenna 14 of the reader writer 11 is transmittable, the radiated carrier wave is received by the antenna 25, and DC (Direct Current) voltage components contained in the received carrier wave are removed by the capacitor 26.

The rectifier 27 is operative to rectify the carrier wave from which the DC components are removed to generate power (a predetermined DC voltage) to supply the DC voltage to the control circuit 29 and the other components in the RF tag 24. On the other hand, the demodulator 28 is operative to demodulate the data superimposed on the carrier wave to send it to the control circuit 29. The control circuit 29, which is running based on the DC voltage supplied from the rectifier 27, is operative to receive the data (at least one command) sent from the demodulator 28 and to read out at least one item of data from the memory 30, which corresponds to the data (at least one command).

Based on the at least one item of data, the control circuit 29 is operative to send the control signals to the control terminal of the switch 32 to open and close it based on the readout data, thereby modulating the amplitude of the carrier wave received by the antenna 25 by load modulation. The load-modulated carrier wave on which a response signal (baseband signal) corresponding to the at least one item of data is superimposed is transmitted (reflected) by the antenna 25 to the antenna 14 of the tag reader 11 as a response wave.

When the response wave reflected by the antenna 25 is received by the antenna 14, the received response wave is supplied to the receiving circuit 16 through the waveform shaping circuit 15.

The mixer 20 of the receiving circuit 16 is operative to perform synchronized-detection by mixing the carrier wave supplied from the transmitting circuit 13 and the response wave supplied from the waveform shaping circuit 15. The filter 21 is operative to allow the response signal (baseband signal) to pass therethrough, thereby detecting the response signal superimposed on the response wave.

The amplifier 22 is operative to amplify the detected response signal to send it to the binary circuit 23. The binary circuit 23 is operative to binarize the response signal sent from the amplifier 22 to generate binary data composed of two discrete voltage levels, one of which corresponds to logic 1, and the other thereof corresponds to logic 0. The generated binary data is sent to the control circuit 12.

Figure 3A:
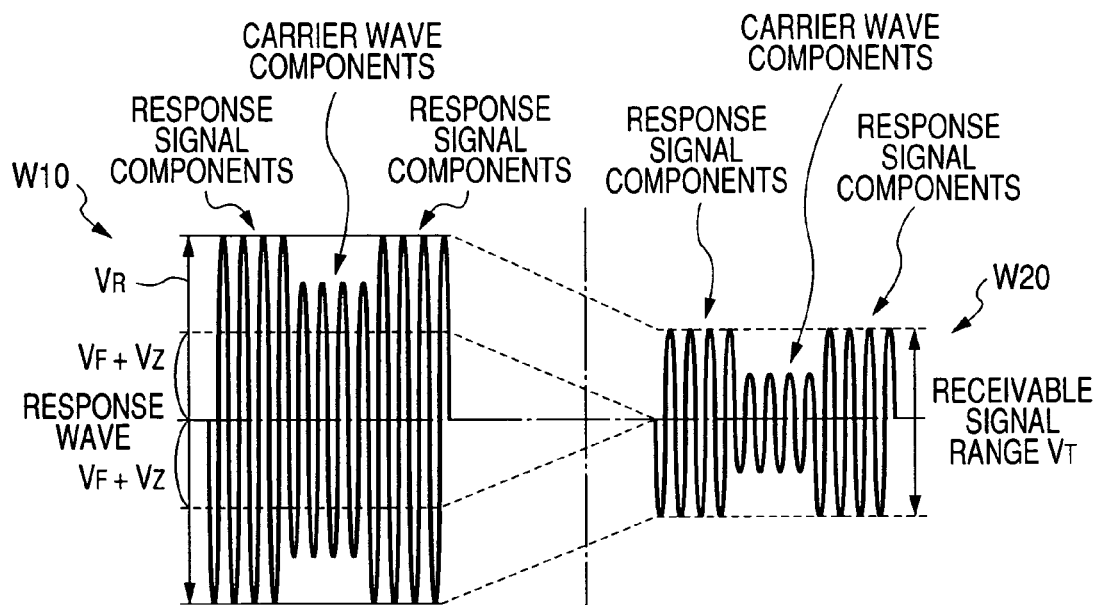
FIG. 3A is a view schematically illustrating an example of the waveform of a response wave before being received by the waveform shaping circuit and the waveform of the response wave output from the waveform shaping circuit when an RF tag modulates a carrier wave using subcarrier load modulation.

In the first embodiment, the mixer 20 and the filter 21 serve as synchronized-detection demodulator, and the receiving circuit 16 (the synchronized-detection demodulator) has a receivable signal range $V_T$ that allows the response wave to be receivable by the synchronized-detection demodulator of the receiving circuit 16 (see FIG. 3A). In other words, the receiving circuit 16 (the synchronized-detection demodulator) has a receivable signal level $V_L$ corresponding to the receivable signal range $V_T$ and allowing the response wave to be receivable by the synchronized-detection demodulator of the receiving circuit 16 (see FIG. 3B).

Figure 2:
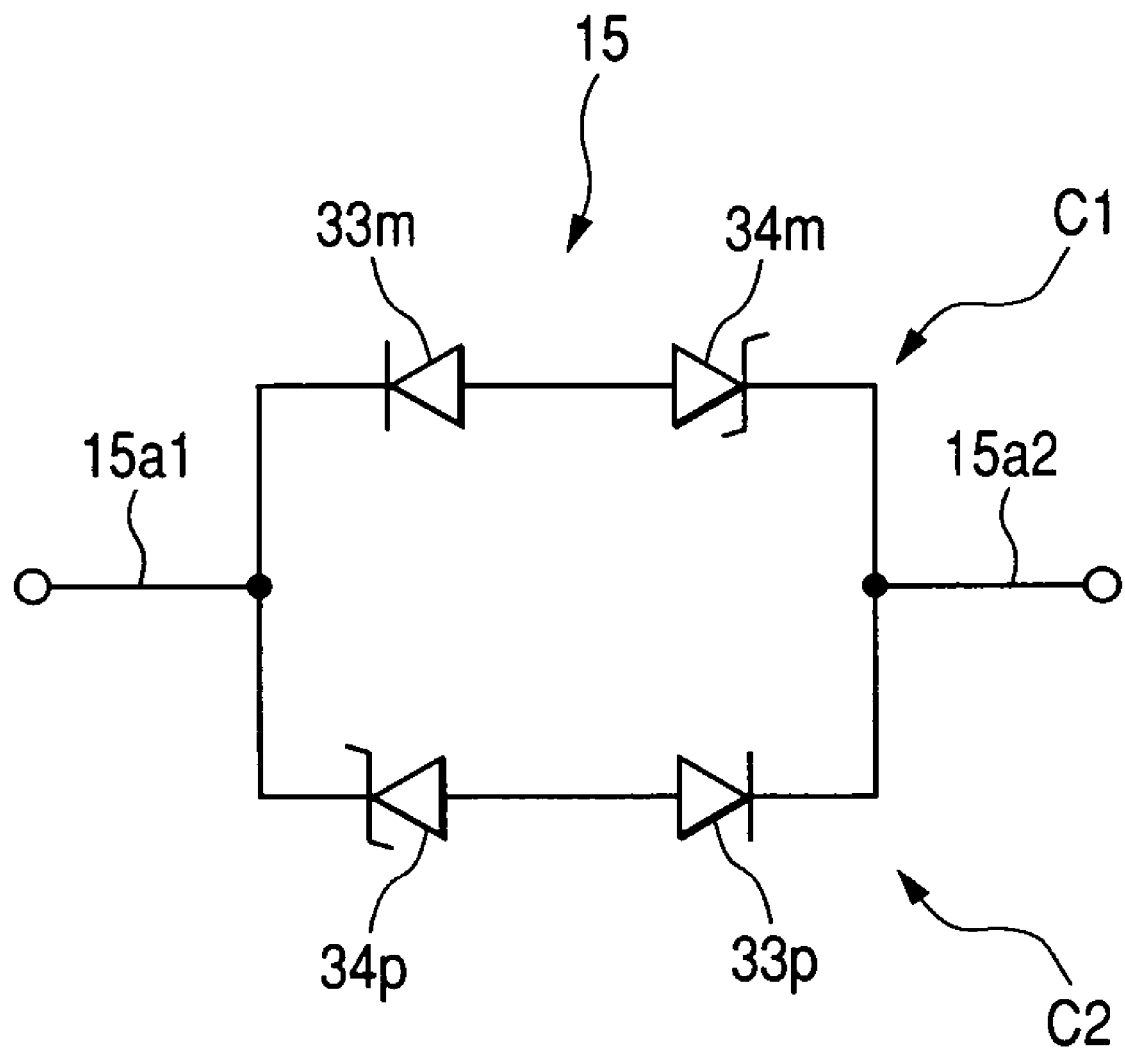
FIG. 2 is a circuit diagram schematically illustrating an example of the circuit structure of a waveform shaping circuit illustrated in FIG. 1 according to the first embodiment of the present invention.

In addition, FIG. 2 illustrates an example of the circuit structure of the waveform shaping circuit 15 according to the first embodiment of the present invention.

As shown in FIG. 2, the waveform shaping circuit 15 is provided with a first diode series circuit C1 composed of a first diode 33m and a first zener diode 34m. The anode of the first zener diode 34m is electrically connected in common to that of the first diode 33m. In addition, the waveform shaping circuit 15 is provided with a second diode series circuit C2 composed of a second diode 33p and a second zener diode 34p. The anode of the second zener diode 34p is electrically connected in common to that of the second diode 33p.

The first diode series circuit C1 and the second diode series circuit C2 are connected back-to-back. Specifically, the cathode of the first diode 33m is electrically connected in common to that of the zener diode 34p. The commonly connected cathodes of the diodes 33m and 34p provide an input terminal 15a1 of the waveform shaping circuit 15 to which the antenna 14 is electrically connected so that the response wave received by the antenna 14 is input to the waveform shaping circuit 15 through its input terminal 15a1.

In addition, the cathode of the first zener diode 34m is electrically connected in common to that of the second diode 33p. The commonly connected cathodes of the diodes 34m and the 33p provide an output terminal 15a2 of the waveform shaping circuit 15 to which the mixer 20 is electrically connected so that an output signal from the circuit 15 is input to the mixer 20 through its output terminal 15a2.

The waveform shaping circuit 15 is configured to allow the positive part (positive half of the response wave, which is input to the waveform shaping circuit 15 through its input terminal 15a1, to pass through the second zener diode 34p and the second diode 33p of the second diode series circuit C2. The waveform shaping circuit 15 is also configured to allow the negative part (negative half of the response wave to pass through the first diode 33m and the first zener diode 34m of the first diode series circuit C1.

Next, operations of the reader / writer 11 according to the first embodiment will be described hereinafter with reference to FIGS. 1 to 3C.

As clearly understood in the structure of the reader / writer 11, while the carrier wave is sent from the transmitting circuit 13 to the antenna 14, the carrier wave is also constantly sent to the receiving circuit 16 through the waveform shaping circuit 15.

Because the receiving circuit 16 is designed as an IC operating on approximately 3.0 V, it is necessary to limit the peak-to-peak voltage level of the response wave before being received by the mixer 20 to not more than approximately 3.0 peak-to-peak voltage (3.0 $V_{p-p}$).

That is, in the first embodiment, the waveform shaping circuit 15 is operative to shape the waveform of the response wave so as to allow the peak-to-peak voltage level of the response wave before being received by the mixer 20 to not more than 3.0 $V_{p-p}$.

Specifically, when the positive half of the response wave is input to the waveform shaping circuit 15 through its input terminal 15a1, because the first diode 33m is reverse-biased and the first zener diode 34m is forward-biased with respect to the positive half of the response wave, it dose not flow through the first diode series circuit C1.

In contrast, because the second zener diode 34p is reverse-biased and the second diode 33p is forward-biased with respect to the positive half of the response wave, it flows through the second diode series circuit C2 so that the diodes 34p and 33p are conducting.

When the negative half of the response wave is input to the waveform shaping circuit 15 through its input terminal 15a1, because the second zener diode 34p is forward-biased and the second diode 33p is reverse-biased with respect to the negative half of the response wave, it dose not flow through the second diode series circuit C2.

In contrast, because the first diode 33m is forward-biased and the first zener diode 34m is reverse-biased with respect to the negative half of the response wave, it flows through the first diode series circuit C1 so that the diodes 33m and 34m are conducting.

Note that the forward voltage of each of the diodes 33m and 33p is represented as $V_F$, and the zener voltage of each of the zener diodes 34m and 34p is represented as $V_Z$. The waveform shaping circuit 15 allows the voltage level (amplitude) of the response wave passing therethrough to be reduced by the level of "$V_F + V_Z$". In addition, note that the peak-to-peak amplitude of the response wave is represented as "$V_R$".

FIG. 3A illustrates an example of the waveform W10 of the response wave before being received by the waveform shaping circuit 15 when the RF tag 24 modulates the amplitude of the carrier wave using subcarrier load modulation. FIG. 3A also illustrates an example of the waveform W20 of the response wave output from the waveform shaping circuit 15.

Figure 3B:
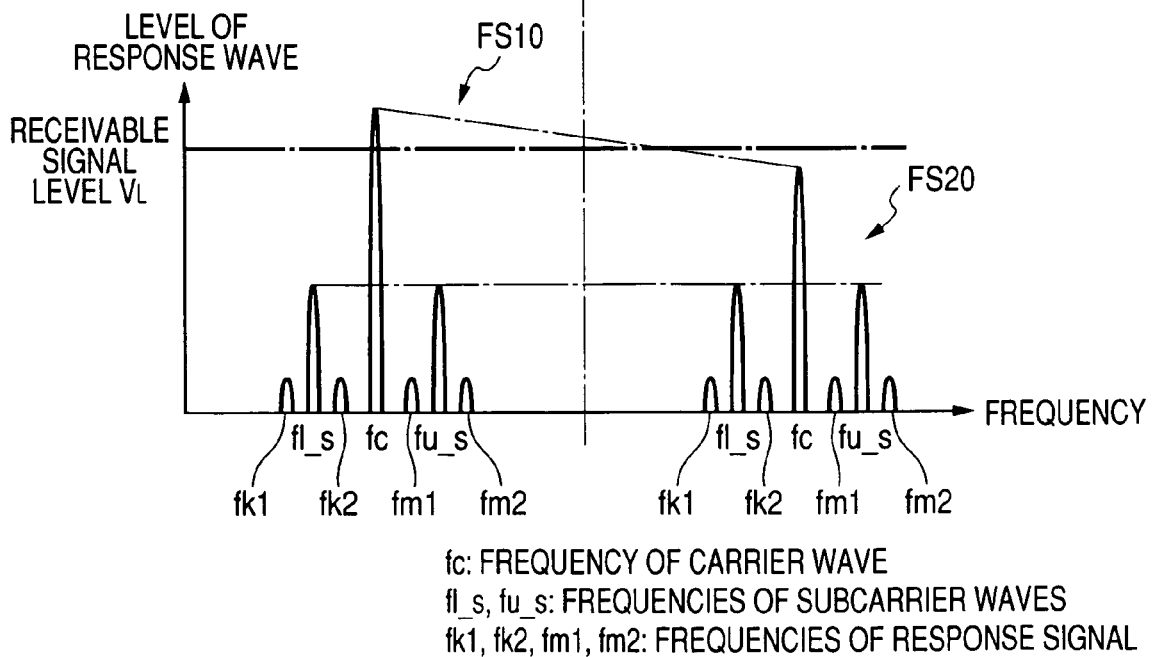
FIG. 3B is a view schematically illustrating a frequency spectrum of the waveform of the response wave before being received by the waveform shaping circuit, and that of the waveform of the response wave output from the waveform shaping circuit.

In addition, FIG. 3B illustrates the frequency spectrum FS10 of the waveform W10 of the response wave and the frequency spectrum FS20 of the waveform W20 thereof.

Specifically, in the waveform shaping circuit 15 according to the first embodiment, the zener voltage $V_Z$ has been set to meet the following relation:

$$(V_F + V_Z) \leq (V_R - V_T)/2$$

That is, the waveform shaping circuit 15 permits the amplitudes (levels) of the carrier wave components of both the positive half and negative half of the response wave to be attenuated by a predetermined level. The predetermined level is equivalent to not more than one half of the value obtained by subtracting the voltage corresponding to the receivable signal range $V_T$ from the peak-to-peak voltage $V_R$ of the response wave.

For example, in the first embodiment, assuming that the forward voltage $V_F$ of each of the diodes 33m and 33p is 0.7 V, the peak-to-peak voltage $V_R$ of the response wave is 20 V, and the receivable signal range $V_T$ is 3.0 V, the zener diode $V_Z$ has been set to a value that meets the following relation:

$$V_Z = (20 - 3.0)/2 - 0.7 = 7.8 \; (V)$$

This permits the waveform W2 of the response signal output from the waveform shaping circuit 15 to become a predetermined waveform thereof whose carrier wave components exceeding the receivable signal range $V_T$ are attenuated without substantially affecting the envelope of the response signal output from the waveform shaping circuit 15.

In other words, the waveform shaping circuit 15 is configured to attenuate the peal-to-peak level of each of the carrier wave components exceeding the receivable signal range $V_T$, and to maintain each of the peak-to-peak levels of the response signal components, which does not exceed the receivable signal range $V_T$.

Figure 3C:
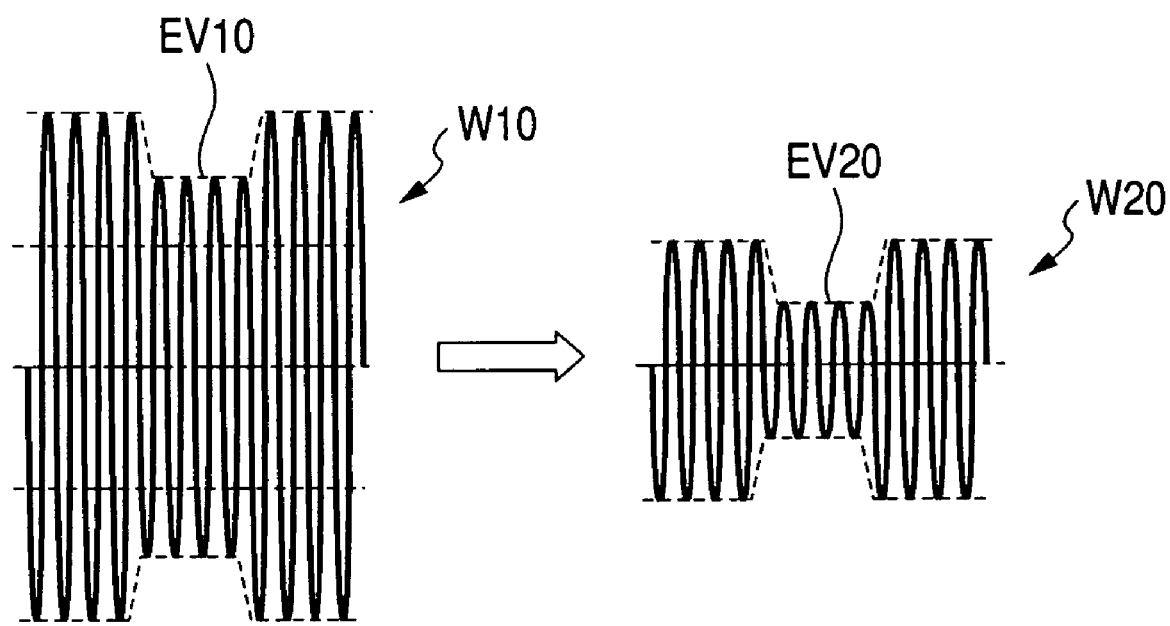
FIG. 3C illustrates the envelope of the waveform of the response wave before being received by the waveform shaping circuit, and that of the waveform of the response wave output from the waveform shaping circuit.

Specifically, as clearly illustrated in FIG. 3C, the envelope EV10 of the waveform of the response wave before being received by the waveform shaping circuit 15 is substantially identical to the envelope EV20 of the waveform of the response signal output therefrom.

Note that the attenuation of the response wave by the waveform shaping circuit 15 translates into amplification of the response wave thereby.

Specifically, subtraction of the voltage level of "$V_F+V_Z$" from the voltage level of each of the carrier wave components by the waveform shaping circuit 15 is equivalent to amplification of the voltage level of each of the carrier wave components contained in the response wave by a predetermined gain less than 1.0. The gain means the ratio of a signal (wave) output from the circuit 15 to a signal (wave) input thereto.

In addition, maintain of the voltage level of each of the response signal components by the waveform shaping circuit 15 is equivalent to amplification of the voltage level of each of the response signal components contained in the response wave by the gain of substantially 1.0.

That is, the waveform shaping circuit 15 serves as a first amplifying circuit configured to nonlinearly amplify the response wave.

Furthermore, the waveform shaping circuit 15 can be equivalent to a second amplifying circuit. The second amplifying circuit amplifies the amplitude (voltage level) of each of first components contained in the response wave input to the circuit 15 by a first predetermined gain that permits each of the first components whose amplitude is equal to or lower than a predetermined amplitude to disappear in an output signal output from the circuit 15. For example, the predetermined amplitude can be set to the amplitude of each of the carrier wave components.

In addition, the second amplifying circuit (the waveform shaping circuit 15) that amplifies the amplitude (voltage level) of each of second components contained in the response wave input to the circuit 15 by a second predetermined gain that permits each of the second components whose amplitude is higher than the predetermined amplitude to appear in the output signal output from the circuit 15. In other words, the second amplifying circuit (the waveform shaping circuit 15) can have a dead range with respect to the first components contained in the response wave input to the circuit 15.

In the first embodiment, because the RF tag 24 uses load modulation to modulate the amplitude of the waveform of the carrier wave, the response signal components are contained in the envelope EV10 of the response wave (see FIG. 3C).

Figure 9:
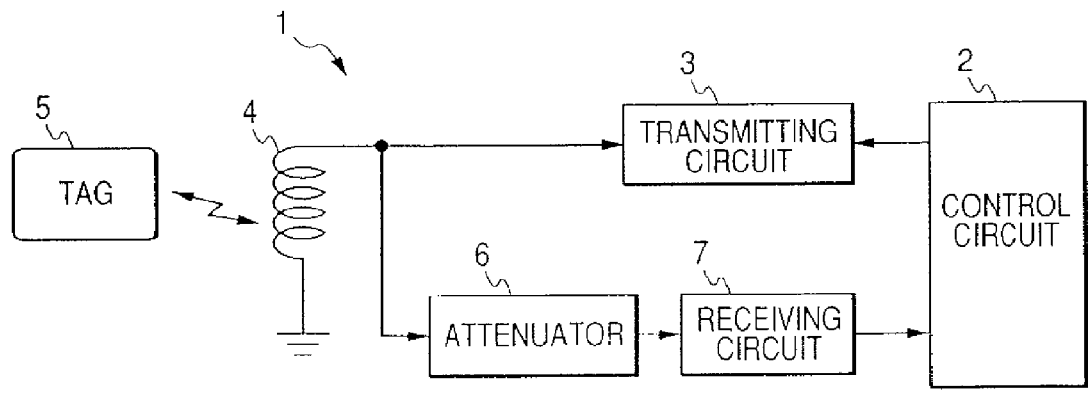
FIG. 9 is a block diagram schematically illustrating the structure of a conventional noncontact tag reader for avoiding the limitation of the level of a response wave before being received by a synchronized-detection demodulator.
Figure 10A:
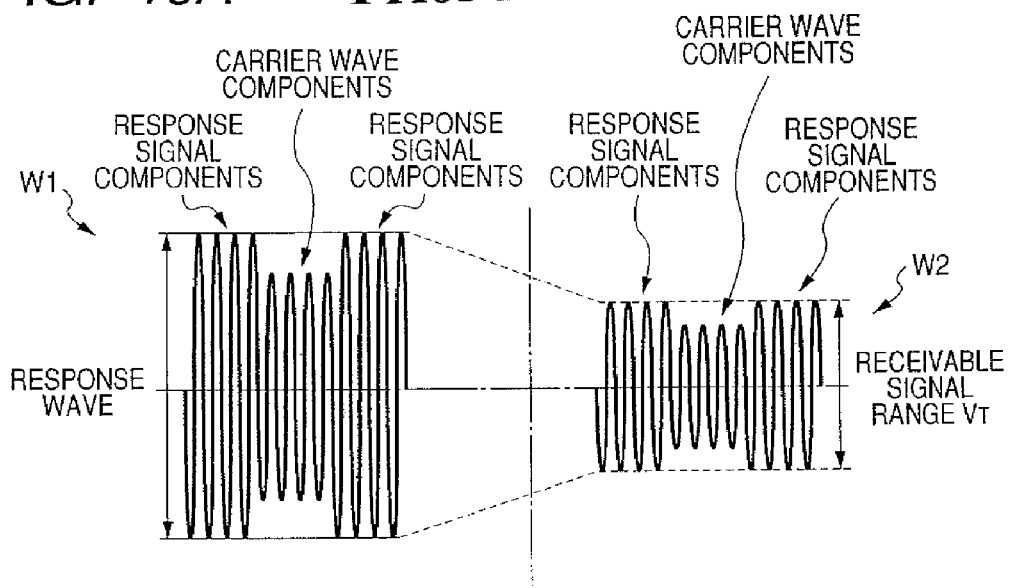
FIG. 10A is a view schematically illustrating the waveform of a response wave input to a receiving circuit and that of the response wave output therefrom.
Figure 10B:
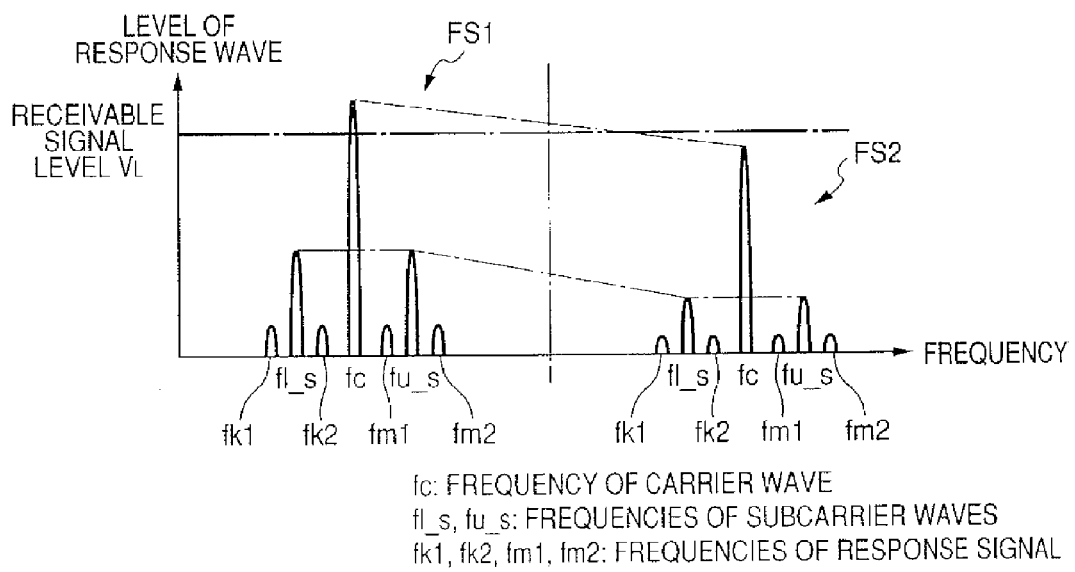
FIG. 10B is a view schematically illustrating a frequency spectrum of each of the waveforms of the response wave illustrated in FIG. 10A.
Figure 10C:
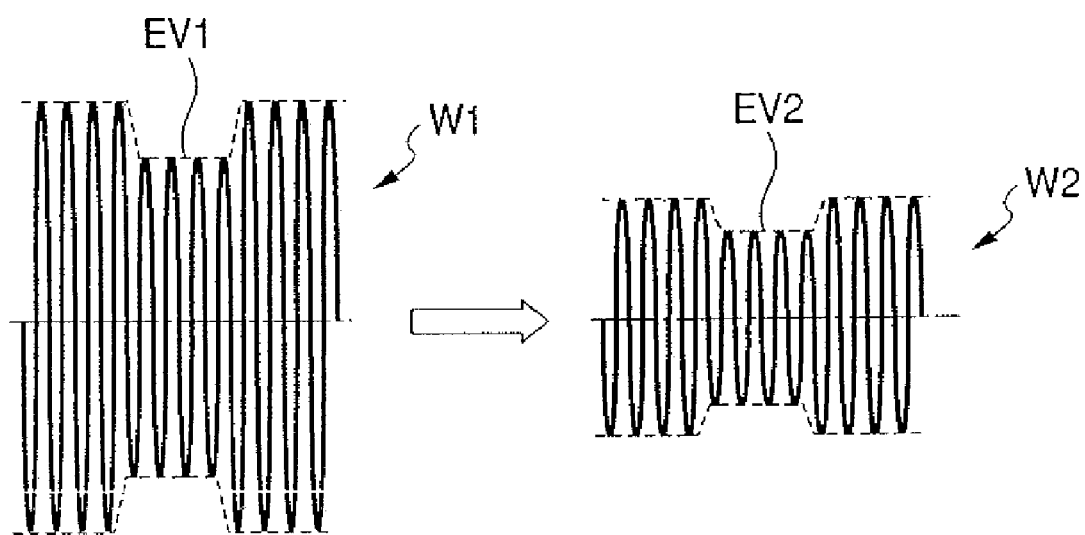
FIG. 10C is a view schematically illustrating an envelope of each of the waveforms of the response wave illustrated in FIG. 10A.

As illustrated in FIGS. 9, 10A, and 10B, when the levels (amplitudes) of all components of the response wave are uniformly attenuated by the attenuator 6 set forth above, the envelope EV1 of the waveform W1 may change into the envelope EV2 of the waveform W2 such that the level (peak-to-peak) of each of the response signal components contained in the response wave drops.

In contrast, in the structure of the first embodiment, the waveform shaping circuit 15 selectively attenuates the carrier wave components contained in the response wave with the response signal components maintained. This allows the envelope EV10 of the waveform of the response wave before being received by the waveform shaping circuit 15 to be substantially identical to the envelope EV20 of the waveform of the response signal output therefrom. In other words, it is possible to keep the levels of the frequency components of the response signal while the response signal passes through the waveform shaping circuit 15 (see FIG. 3B).

As described above, in the first embodiment, there is provided the waveform shaping circuit 15 operative to selectively attenuate the levels of the carrier wave components contained in the response wave transmitted from the RF tag 24 using load modulation while maintaining the levels of the response signal components contained therein. This allows selective suppression of the carrier wave components without reducing the receiving sensitivity of the receiving circuit 16 of the tag reader 11, making it possible to more enhance a communicable distance of the tag reader 11 with respect to the RF tag 24.

In addition, in the structure of the first embodiment, the mixer 20 provided in the receiving circuit 16 can carry out synchronized-detection without limiting the levels of the response signal components contained in the response wave, making it possible to increase the tag reader's receiving sensitivity to the response signal components contained in the response wave.

Moreover, in the first embodiment, the waveform shaping circuit 15 is designed such that the first diode series circuit C1 composed of the diode 33m and zener diode 34m electrically connected to each other in series, and the second diode series circuit C2 composed of the diode 33p and zener diode 34p electrically connected to each other in series are connected back-to-back. Specifically, adjustment of the zener voltage of each of the zener diodes 34p and 34m allows the amplitudes (levels) of the carrier wave components of both the positive half and negative half of the response wave to be attenuated by the predetermined level. The predetermined level is equivalent to not more than one half of the value obtained by subtracting the voltage corresponding to the receivable signal range $V_T$ from the peak-to-peak voltage $V_R$ of the response wave.

Second Embodiment

A second embodiment of the present invention will be described hereinafter with reference to FIG. 4. Note that elements of a tag reader according to the second embodiment, which are substantially identical to those of the tag reader 11 according to the first embodiment shown in FIG. 1, are represented by the same reference characters as in FIG. 1, so that the descriptions of the elements of the tag reader according to the second embodiment are omitted or simplified.

Figure 4:
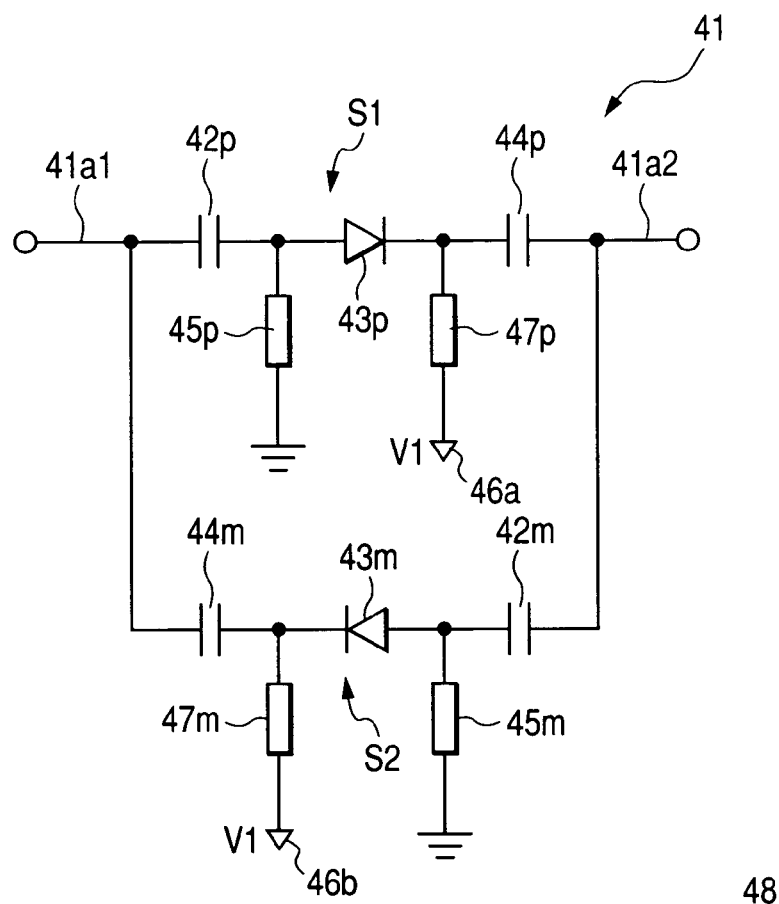
FIG. 4 is a circuit diagram schematically illustrating an example of the circuit structure of a waveform shaping circuit according to a second embodiment of the present invention.

In the second embodiment, as illustrated in FIG. 4, the structure of a waveform shaping circuit 41 of the tag reader is different from that of the waveform shaping circuit 15 of the first embodiment.

Specifically, the waveform shaping circuit 41 according to the second embodiment is provided with an input terminal 41a1 electrically connected to the antenna 14, an output terminal 41a2 electrically connected to the mixer 20, and a first series circuit S1 connected between the first and second output terminals 41a1 and 41a2.

The first series circuit S1 is composed of a first capacitor 42p, a diode 43p whose anode is connected to the first capacitor 42p in series, and a second capacitor 44p to which the cathode of the diode 43p is connected in series.

The waveform shaping circuit 41 is also provided with a first resistor 45p connected between the anode of the diode 43p and the ground. The waveform shaping circuit 41 is further provided with a voltage source 46a of a predetermined voltage V1 and a second resistor 47p one end of which is connected to the cathode of the diode 43p, and the other end thereof is connected to the voltage source 46a. The first and second capacitors 42p and 44p serve as coupling capacitors for cutting DC voltage components passing through the first series circuit S1.

In addition, the waveform shaping circuit 41 is provided with a second series circuit S2 connected between the first and second output terminals 41a1 and 41a2 in parallel to the first series circuit S1.

The second series circuit S2 is composed of a third capacitor 42m, a diode 43m whose anode is connected to the third capacitor 42m in series, and a fourth capacitor 44m to which the cathode of the diode 43m is connected in series. That is, the direction of the diode 43m is reversed with respect to that of the diode 43p.

The waveform shaping circuit 41 is also provided with a third resistor 45m connected between the anode of the diode 43m and the ground. The waveform shaping circuit 41 is further provided with a voltage source 46b of the same voltage V1 and a fourth resistor 47m one end of which is connected to the cathode of the diode 43m, and the other end thereof is connected to the voltage source 46b. Similarly, the third and fourth capacitors 42m and 44m serve as coupling capacitors for cutting DC voltage components passing through the second series circuit S2.

The waveform shaping circuit 41 is configured to allow the positive half of the response wave, which is input to the waveform shaping circuit 41 through its input terminal 41a1, to pass through the first series circuit S1. The waveform shaping circuit 41 is also configured to allow the negative half of the response wave to pass through the second series circuit S2.

Next, operations of the tag reader according to the second embodiment will be described hereinafter with reference to FIG. 4.

When the positive half of the response wave is input to the waveform shaping circuit 41 through its input terminal 41a1, because the diode 43m of the second series circuit S2 is reverse-biased with respect to the positive half of the response wave, it does not flow through the second series circuit S2.

In contrast, because the diode 43p of the first series circuit S1 is forward-biased with respect to the positive half of the response wave, it flows through the first series circuit S1. This allows the diode 43p to be conducting, so that the potential at the output terminal 41a2 decreases by the forward voltage $V_F$ across the diode 43p, and further drops by the voltage V1 of the voltage source 46a.

Similarly, when the negative half of the response wave is input to the waveform shaping circuit 41 through its input terminal 41a1, because the diode 43p of the first series circuit S1 is reverse-biased with respect to the negative half of the response wave, it does not flow through the first series circuit S1.

In contrast, because the diode 43m of the second series circuit S2 is forward-biased with respect to the negative half of the response wave, it flows through the second series circuit S2. This allows the diode 43m to be conducting, so that the potential at the output terminal 41a2 decreases by the forward voltage VF across the diode 43m, and further drops by the voltage V1 of the voltage source 46b.

Like the first embodiment, it is possible to determine the voltage V1 of each of the diodes 43p and 43m in the same manner as the zener voltage $V_Z$ of each of the zener diodes 34m and 34p.

Specifically, setting of the voltage V1 of each of the diodes 43p and 43m allows an attenuation amount of each of the amplitudes (levels) of the carrier wave components of both the positive half and negative half of the response wave to be suitably adjusted.

Third Embodiment

A third embodiment of the present invention will be described hereinafter with reference to FIG. 5. Note that elements of a tag reader according to the third embodiment, which are substantially identical to those of the tag reader according to the first or second embodiment shown in FIG. 1 or FIG. 4, are represented by the same reference characters as in FIG. 1 or FIG. 4, so that the descriptions of the elements of the third embodiment are omitted or simplified.

Figure 5:
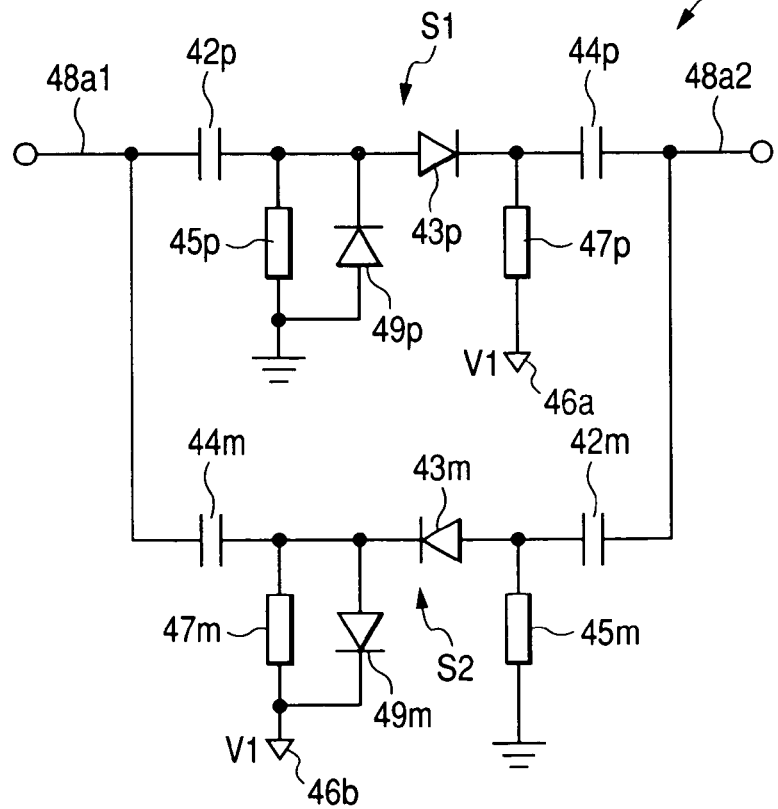
FIG. 5 is a circuit diagram schematically illustrating an example of the circuit structure of a waveform shaping circuit according to a third embodiment of the present invention.

In the third embodiment, as illustrated in FIG. 5, the structure of a waveform shaping circuit 48 of the tag reader according to the third embodiment is slightly different from that of the waveform shaping circuit 45 of the tag reader according to the second embodiment.

Specifically, in addition to the structure of the waveform shaping circuit 45, the waveform shaping circuit 48 is provided with a diode 49p whose anode is electrically connected to the ground in parallel to the resistor 45p. Moreover, the waveform shaping circuit 48 is provided with a diode 49m whose anode is electrically connected to between the voltage source 46b and the resistor 47m in parallel to the resistor 47m. Note that the input terminal and output terminal of the waveform shaping circuit 48 are represented as 48a1 and 48a2, respectively.

Next, operations of the tag reader according to the third embodiment will be described hereinafter with reference to FIG. 5.

When the negative half of the response wave is input to the waveform shaping circuit 41 through its input terminal 41a1, because the diode 43p of the first series circuit S1 is reverse-biased with respect to the negative half of the response wave, it does not flow through the diode 43p. However, because the cathode of the diode 49p is connected to the anode of the diode 43p and the anode of the diode 49p is connected to the ground, the negative half of the response wave input through the input terminal 48a1 flows through the diode 49p to the ground. This allows the diode 49p to be conducting, so that the potential of the cathode of the diode 49p is set to a value=$V_G+V_F$, where $V_F$ represents the forward voltage of the diode 49p, and $V_G$ represents the potential level of the ground.

Specifically, assuming that the potential level $V_G$ of the ground is 0 V, the waveform of the positive half of the response wave output from the waveform shaping circuit 48 is shaped such that the voltage levels of the components of the positive half of the response wave below the voltage level $V_F$ are clipped. This shifts the minimum values of the amplitudes of the positive half of the response wave to the positive side by the voltage level $V_F$ so that the amplitudes of the positive half of the response wave are attenuated by the voltage level $V_F$.

After that, like the second embodiment, the amplitudes of the positive half of the response wave are further attenuated by the voltage level $V_F$ across the diode 43p and the voltage V1 of the voltage source 46a.

That is, in the third embodiment of the present invention, the amplitudes (levels) of the positive half of the response wave are attenuated by the sum of "V1 and 2 $V_F$".

On the other hand, when the positive half of the response wave is input to the waveform shaping circuit 41 through its input terminal 41a1, because the diode 43m of the second series circuit S2 is reverse-biased with respect to the positive half of the response wave, it does not flow through the diode 43m. However, because the anode of the diode 49m is connected to the cathode of the diode 43m and the cathode of the diode 49m is connected to the ground, the positive half of the response wave input through the input terminal 48a1 flows through the diode 49m to the ground. This allows the diode 49m to be conducting, so that the potential of the anode of the diode 49m is set to a value=$V1+V_F$, where $V_F$ represents the forward voltage of the diode 49m, and V1 represents the predetermined voltage of the voltage source 46b.

Specifically, the waveform of the negative half of the response wave output from the waveform shaping circuit 48 is shaped such that the absolute values of the voltage levels of the components of the negative half of the response wave below the absolute value of the voltage level of V1+$V_F$ are clipped. This shifts the bottom portions of the amplitudes of the negative half of the response wave to the negative side by the voltage level of V1+$V_F$ so that the amplitudes of the negative half of the response wave are attenuated by the voltage level of V1+$V_F$.

After that, like the second embodiment, the amplitudes of the negative half of the response wave are further attenuated by the voltage level $V_F$ across the diode 43*m*.

That is, in the third embodiment of the present invention, like the positive half of the response wave, the amplitudes (levels) of the negative half of the response wave are attenuated by the sum of "V1 and 2 $V_F$".

Therefore, like each of the first and second embodiments, it is possible to adjust the V1 and $V_F$ to set the sum of "V1 and 2$V_F$" to a predetermined value not more than the voltage level of each of the carrier wave components of the response wave. This allows the levels of the carrier wave components of the response wave to be attenuated with the levels of the response signal components maintained.

In addition, in the third embodiment, the amplitudes of the response signal components of each of the positive half and negative half of the response wave are approximately twice as much as those of the response signal components obtained by the waveform shaping circuit 41 according to the second embodiment. The amplitudes of the response signal components of the positive half of the response wave are combined to those of the response signal components of the negative half thereof at the output terminal 48*a*2 of the circuit 48. This results in that the amplitudes of the response wave (voltage wave) output from the circuit 48 through its output terminal 48*a*2 are approximately twice as much as those of the response wave output from the circuit 41 through its output terminal 41*a*2 according to the first embodiment.

Fourth Embodiment

A fourth embodiment of the present invention will be described hereinafter with reference to FIGS. 6 and 7. Note that elements of a tag reader according to the fourth embodiment, which are substantially identical to those of the tag reader 11 according to the first embodiment shown in FIG. 1, are represented by the same reference characters as in FIG. 1, so that the descriptions of the elements of the tag reader according to the fourth embodiment are omitted or simplified.

Figure 6:
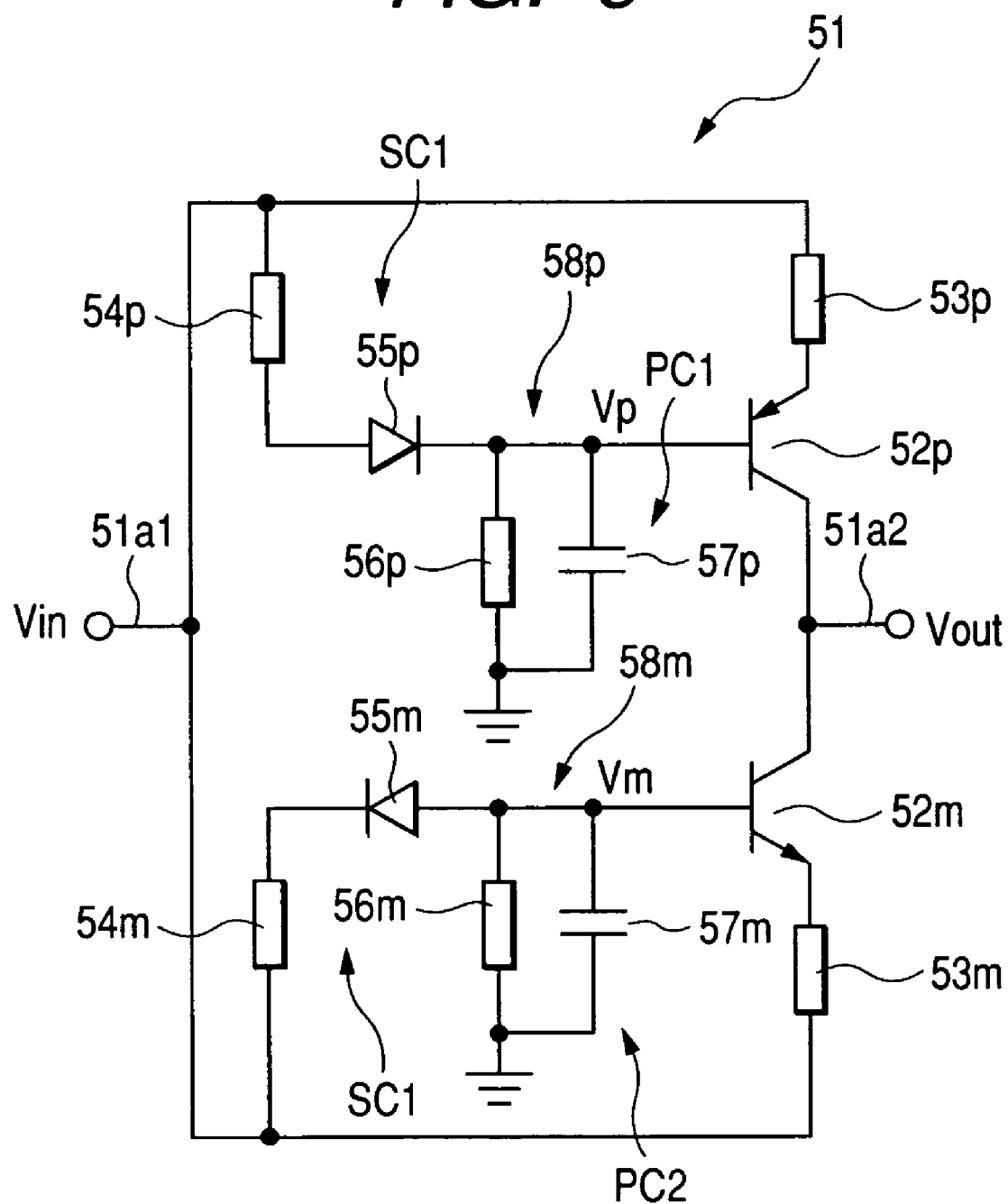
FIG. 6 is a circuit diagram schematically illustrating an example of the circuit structure of a waveform shaping circuit according to a third embodiment of the present invention.

In the fourth embodiment, as illustrated in FIG. 6, the structure of a waveform shaping circuit 51 of the tag reader is different from that of the waveform shaping circuit 15 of the first embodiment.

Specifically, the waveform shaping circuit 51 according to the fourth embodiment is provided with an input terminal 51*a*1, an output terminal 51*a*2, and PNP and NPN transistors 52*p* and 52*m* in push-pull connection. The push-pull connected transistors 52*p* and 52*m* are disposed to the output stage of the waveform shaping circuit 51.

The emitters (charge carrier emitting regions) of the transistors 52*p* and 52*m* are connected to the input terminal 51*a*1 through resistors 53*p* and 53*m*, respectively. The collectors (charge carrier collecting regions) of the transistors 52*p* and 52*m* are electrically connected in common to the output terminal 51*a*2 of the circuit 51.

Between the input terminal 51*a*1 and the base (control region) of the PNP transistor 52*p* a first series circuit SC1 is connected; the first series circuit SC1 is composed of a resistor 54*p* and a diode 55*p* connected to each other in series. Specifically, the cathode of the diode 55*p* is connected to the base of the transistor 52*p*, and the anode thereof is connected to the resistor 54*p*.

Between the base of the PNP transistor 52*p* and the ground a first parallel circuit PC1 is connected; the first parallel circuit PC1 is composed of a resistor 56*p* and a capacitor 57*p* connected in parallel to each other.

In addition, between the input terminal 51*a*1 and the base of the NPN transistor 52*m* a second series circuit SC2 is connected; the second series circuit SC2 is composed of a resistor 54*m* and a diode 55*m* connected to each other in series. Specifically, the cathode of the diode 55*m* is connected to the resistor 55*m* and the anode of the diode 55*m* is connected to the base of the transistor 52*m*.

Between the base of the NPN transistor 52*m* and the ground a second parallel circuit PC2 is connected; the second parallel circuit PC2 is composed of a resistor 56*m* and a capacitor 57*m* connected in parallel to each other. The direction of the diode 55*p* is reversed with respect to that of the diode 55*m*.

Next, operations of the tag reader according to the fourth embodiment will be described hereinafter with reference to FIGS. 6 and 7.

In the waveform shaping circuit 51, the diode 55*p* and the capacitor 57*p* serve as a first peak hold circuit 58*p* for holding the peak voltage level of the positive half of the response wave input to the circuit 51 through its input terminal 51*a*1.

When in the first peak hold circuit 58*p*, note that the base potential (peak-hold voltage) of the transistor 52*p* is represented as a detection voltage Vp, and a voltage across both ends of the resistor 56*p* is represented as $V_R$, the detection voltage Vp is given by the following equation:

$$Vp=Vin-(V_R+V_F)$$

Where Vin is the voltage level of the positive half of the response wave input to the circuit 51 through its input terminal 51*a*1, and $V_F$ is the forward voltage of the diode 55*p*. The voltage Vin is referred to as "positive input voltage" hereinafter.

The emitter potential of the transistor 52*p* is represented as the sum of the detection voltage Vp and the base-emitter voltage Vbe of the transistor 52*p*. This allows a current to flow through the emitter resistor 53*p* of the transistor 52*p*; the amount of this current depends on the difference between the positive input voltage Vin and the emitter potential corresponding to the sum of the Vp and the Vbe.

Therefore, a voltage=Vin−Vp−Vbe is amplified to be output from the collector of the PNP transistor 52*p* serving as the output terminal 51*a*2 of the circuit 51. In addition, the levels of the carrier wave components contained in the positive half of the response wave are attenuated by the value of "$V_R+V_F$".

Similarly, the diode 55*m* and the capacitor 57*m* serve as a second peak hold circuit 58*m* for holding the peak level of the negative half of the response wave input to the circuit 51 through its input terminal 51*a*1.

Specifically, in the second peak hold circuit 58*m*, note that the base potential (peak-hold voltage) of the transistor 52*m* is represented as a negative detection voltage Vm, and a voltage across both ends of the resistor 56*m* is represented as $V_R$ corresponding to the voltage $V_R$, the detection voltage Vm is given by the following equation:

$$Vm=Vina+V_R+V_F$$

Where Vina is the negative voltage level of the negative half of the response wave input to the circuit 51 through its input terminal 51*a*1, which corresponds to the voltage Vin, and $V_F$ is the forward voltage of the diode 55*m* corresponds to the voltage $V_F$. The voltage Vina is referred to as "negative input voltage" hereinafter.

The emitter potential of the transistor 52*m* is represented as the value obtained by subtracting the base-emitter voltage Vbea of the transistor 52*m*, which corresponds to the base-emitter voltage Vbe, from the detection voltage Vm.

Therefore, a voltage=Vm+Vbea+Vina is amplified to be output from the collector of the NPN transistor 52*m* serving as the output terminal 51*a*2 of the circuit 51. Similarly, the levels of the carrier wave components contained in the negative half of the response wave are attenuated by the value of "$V_R+V_F$".

Specifically, in the fourth embodiment, like each of the first to third embodiments, it is possible to adjust the $V_R$ and $V_F$ to set the sum of "$V_R+V_F$" to a predetermined value not more than the voltage level of each of the carrier wave components of the response wave. This allows the levels of the carrier wave components of the response wave to be attenuated independently of the levels of the response signal components.

Figure 7A:
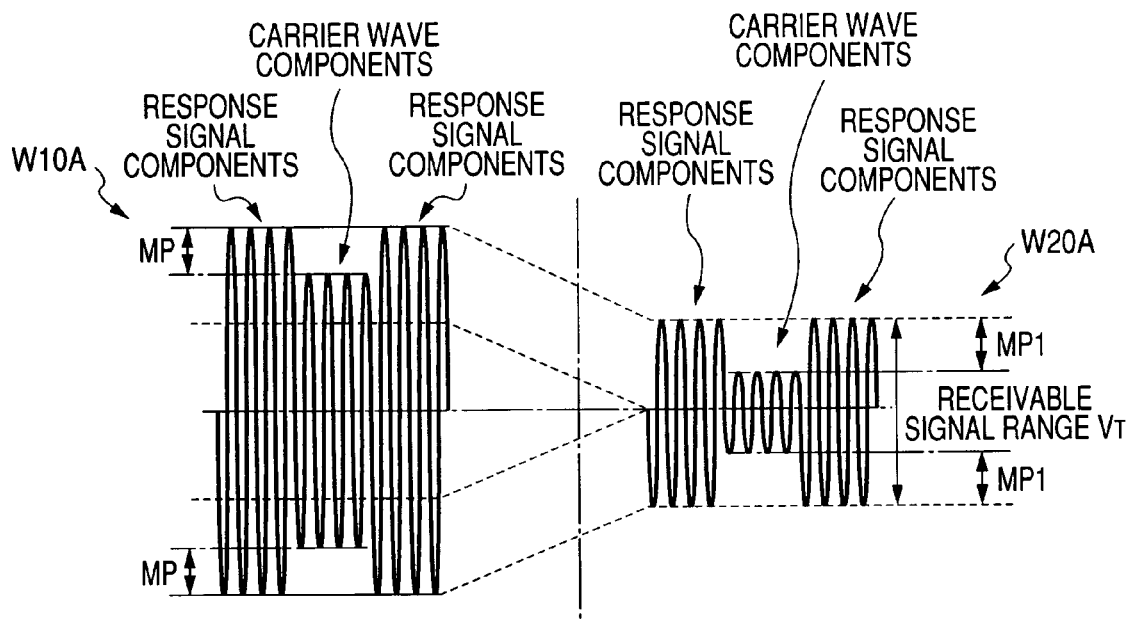
FIG. 7A is a view schematically illustrating an example of the waveform of a response wave before being received by the waveform shaping circuit and the waveform of the response wave output from the waveform shaping circuit when an RF tag modulates a carrier wave using subcarrier load modulation according to the fourth embodiment.

In addition, in the fourth embodiment of the present invention, as illustrated in FIG. 7A, each of the transistors 52*p* and 52*m* allows the modulated portion MP based on the response signal in the waveform W10A of the response wave before being received by the waveform shaping circuit 51 to be amplified. The modulated portion MP corresponds to a changed portion of the envelope of the carrier wave by the amplitude modulation. This results in that the magnitude of the modulated portion MP increases more.

Specifically, as illustrated in FIG. 7A, the magnitude of the modulated portion MP1 in the waveform W20A of the response wave output from the waveform shaping circuit 51 increases as compared with that of the modulated portion MP in the waveform W10A. That is, the response signal components contained in the response wave are amplified by a predetermined gain more than 1.0.

Figure 7B:
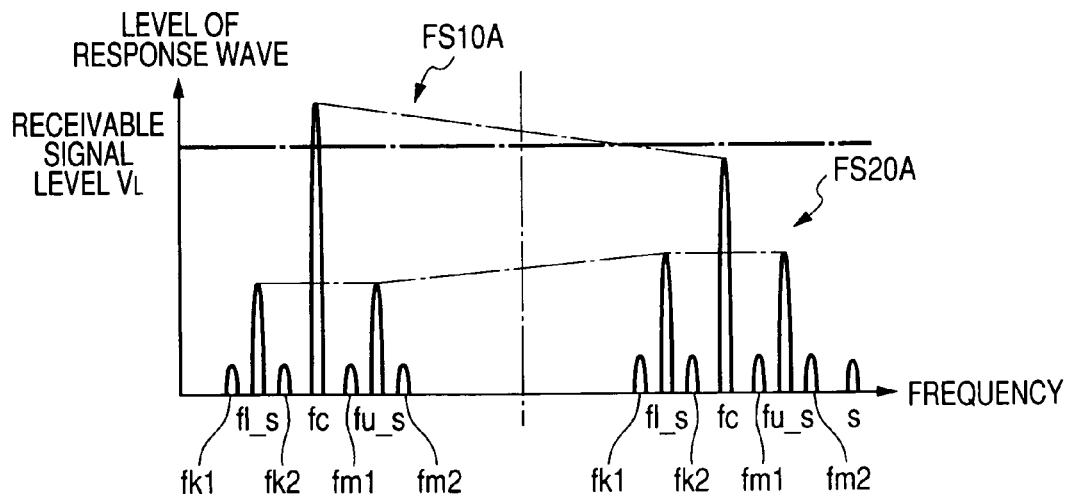
FIG. 7B is a view schematically illustrating a frequency spectrum of the waveform of the response wave before being received by the waveform shaping circuit, and that of the waveform of the response wave output from the waveform shaping circuit according to the fourth embodiment.

In other words, as illustrated in FIG. 7B, the levels of the carrier wave components contained in the response wave decrease, but those of the response signal components increase.

As set forth above, in the fourth embodiment of the present invention, the first and second peak hold circuits 58*p* and 58*m* of the waveform shaping circuit 51 attenuate the carrier wave components of the response wave (input voltage Vin, Vina). In addition, the circuit 51 holds the peak voltage of each of the positive half and negative half of the response wave as the base potential of each of the transistors 58*p* and 58*n*.

Moreover, each of the transistors 52*p* and 52*m* amplifies the modulated portion MP in the waveform W10A of the response wave input to the circuit 51 based on the difference between the base potential of each of the transistors 52*p* and 52*m* and the input voltage level of the response wave; this input voltage level of the response wave is applied to the emitter of each of the transistors 52*p* and 52*m* through each of the resistors 53*p* and 53*m*.

It is possible therefore to selectively attenuate the carrier wave components contained in each of the positive half and negative half of the response wave by the sum of the voltage across both ends of each of the resistors 54*p* and 54*m* and the forward voltage of each of the diodes 55*p* and 55*m* while amplifying the response signal components.

Fifth Embodiment

A third embodiment of the present invention will be described hereinafter with reference to FIG. 8. Note that elements of a tag reader according to the fifth embodiment, which are substantially identical to those of the tag reader according to the first or fourth embodiment shown in FIG. 1 or FIG. 6, are represented by the same reference characters as in FIG. 1 or FIG. 6, so that the descriptions of the elements of the fifth embodiment are omitted or simplified.

Figure 8:
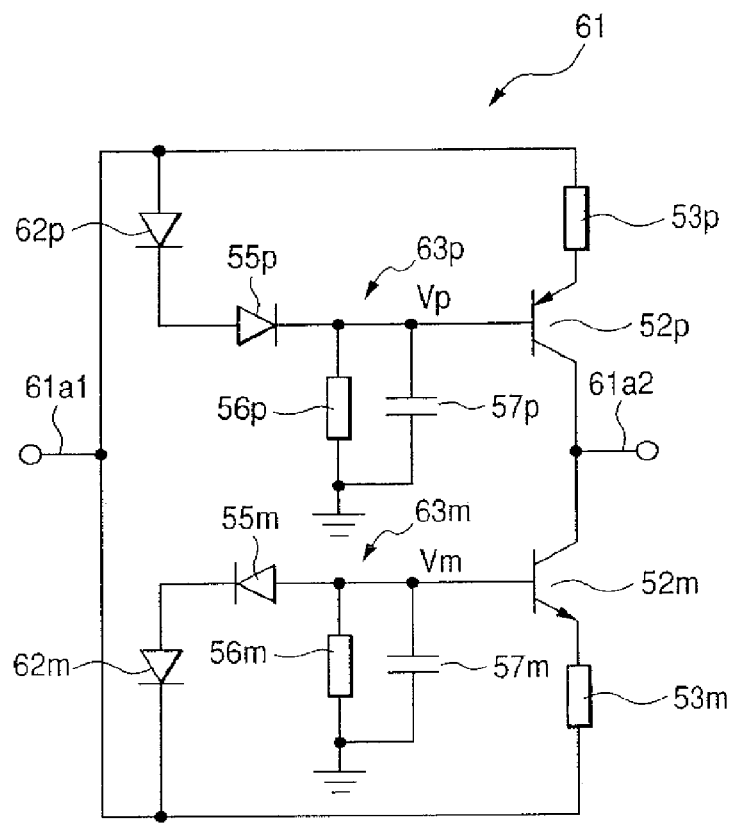
FIG. 8 is a circuit diagram schematically illustrating an example of the circuit structure of a waveform shaping circuit according to a fifth embodiment of the present invention.

In the fifth embodiment, as illustrated in FIG. 8, the structure of a waveform shaping circuit 61 of the tag reader according to the fifth embodiment is slightly different from that of the waveform shaping circuit 51 of the tag reader according to the fourth embodiment.

Note that the input terminal and output terminal of the waveform shaping circuit 51 are represented as 61*a*1 and 61*a*2, respectively.

Specifically, in place of the resistors 54*p* and 54*m*, the waveform shaping circuit 61 is provided with diodes 62*p* and 62*m*. The anode of the diode 62*p* is electrically connected to the input terminal 61*a*1, and the cathode thereof is electrically connected to the anode of the diode 55*p*. Similarly, the anode of the diode 62*m* is electrically connected to the input terminal 61*a*2, and the cathode thereof is electrically connected to the anode of the diode 55*m*.

In the waveform shaping circuit 61, the diodes 55*p* and 62*p* serve as a first peak hold circuit 63*p* for holding the peak voltage level of the positive half of the response wave input to the circuit 61 through its input terminal 61*a*1. Similarly, the diodes 55*m* and 62*m* serve as a second peak hold circuit 63*m* for holding the peak voltage level of the positive half of the response wave input to the circuit 61 through its input terminal 61*a*1.

Specifically, in the structure of the waveform shaping circuit 51 according to the fourth embodiment, the voltage $V_R$ across both ends of each of the resistors 54*p* and 54*m* may vary depending on a current flowing therethrough.

In contrast, in the structure of the waveform shaping circuit 61, the voltage across both ends of each of the diodes 62*p* and 62*m* is a predetermined constant forward voltage $V_{F1}$, making it possible to control the change of the amplitude of the response wave output from the circuit 61 even if the amplitude of the response signal input to the circuit.

In the first embodiment, the cathode of each of the diodes 33*p* and 33*m* and that of each of the zener diodes 34*p* and 34*m* can be connected in common.

In the fourth and fifth embodiments, FETs (Field Effect Transistors) can be used in place of the bipolar transistors 52*p*, 52*m*.

In each of the first to fifth embodiments, another modulation, such as phase modulation can be used in place of amplitude modulation.

In each of the first to fifth embodiments, the present invention is applied to a tag reader / writer, but the present invention can be applied to a tag reader.

As target carriers of the tag reader / writers according to the present invention, IC carriers or other memory devices can be used in place of the RF tags.

While there has been described what is at present considered to be the embodiments and modifications of the present invention, it will be understood that various modifications which are not described yet may be made therein, and it is intended to cover in the appended claims all such modifications as fall within the true spirit and scope of the invention.

What is claimed is:

1. A noncontact information carrier reader for transmitting a carrier wave to a noncontact information carrier, the noncontact information carrier reader comprising:

a receiving unit configured to receive a response wave transmitted from the noncontact information carrier, the response wave being generated by modulating the carrier wave based on a response signal in the noncontact information carrier;

an amplifying unit configured to amplify carrier wave components contained in the received response wave based on a first gain and to amplify response signal components contained in the received response wave based on a second gain, thereby outputting the amplified response wave, the second gain being higher than the first gain; and a synchronized-detection demodulator configured to demodulate the response signal components contained in the amplified response wave outputted from the amplifying unit by mixing the transmitted carrier wave and the amplified response wave outputted therefrom, wherein the amplifying unit comprises:

a first diode series circuit composed of a first diode and a first zener diode, one of cathode and anode of the first diode is connected to corresponding one of cathode and anode of the first zener diode in series; and a second diode series circuit composed of a second diode and a second zener diode, one of cathode and anode of the second diode is connected to corresponding one of cathode and anode of the second zener diode in series, wherein the first diode series circuit and the second diode series circuit are connected in parallel to each other such that the other of the cathode and anode of the first diode of the first diode series circuit is connected to the other of the cathode and anode of the second zener diode of the second diode series circuit, and the other of the cathode and anode of the second diode of the second diode series circuit is connected to the other of the cathode and anode of the first zener diode of the first diode series circuit.

2. A noncontact information carrier reader according to claim 1, wherein the amplifying unit is configured to selectively attenuate the carrier wave components without reducing amplitudes of the response signal components.

3. A noncontact information carrier reader for transmitting a carrier wave to a noncontact information carrier, the noncontact information carrier reader comprising:

a receiving unit configured to receive a response wave transmitted from the noncontact information carrier, the response wave being generated by modulating the carrier wave based on a response signal in the noncontact information carrier;

an amplifying unit configured to amplify carrier wave components contained in the received response wave based on a first gain and to amplify response signal components contained in the received response wave based on a second gain, thereby outputting the amplified response wave, the second gain being higher than the first gain; and a synchronized-detection demodulator configured to demodulate the response signal components contained in the amplified response wave outputted from the amplifying unit by mixing the transmitted carrier wave and the amplified response wave outputted therefrom, wherein the amplifying unit comprises:

an input terminal operatively connected to the receiving unit;

an output terminal operatively connected to the synchronized-detection demodulator;

a first diode whose anode is connected to the input terminal, and whose cathode is connected to the output terminal;

a first impedance element connected between the anode of the first diode and a ground;

a first voltage source connected to the cathode of the first diode;

a second impedance element connected between the cathode of the first diode and the first voltage source;

a second diode whose cathode is connected to the input terminal, and whose anode is connected to the output terminal;

a third impedance element connected between the anode of the second diode and the ground;

a second voltage source connected to the cathode of the second diode; and a fourth impedance element connected between the cathode of the second diode and the second voltage source.

4. A noncontact information carrier reader according to claim 3, wherein the amplifying unit further comprises:

a third diode whose anode is connected to the ground in parallel to the second impedance element; and a fourth diode whose cathode is connected to between the second voltage source and the fourth impedance element in parallel to the fourth impedance element.

5. A noncontact information carrier reader according to claim 3, wherein the amplifying unit is configured to selectively attenuate the carrier wave components without reducing amplitudes of the response signal components.

6. A noncontact information carrier reader for transmitting a carrier wave to a noncontact information carrier, the noncontact information carrier reader comprising:

a receiving unit configured to receive a response wave transmitted from the noncontact information carrier, the response wave being generated by modulating the carrier wave based on a response signal in the noncontact information carrier;

an amplifying unit configured to amplify carrier wave components contained in the received response wave based on a first gain and to amplify response signal components contained in the received response wave based on a second gain, thereby outputting the amplified response wave, the second gain being higher than the first gain; and a synchronized-detection demodulator configured to demodulate the response signal components contained in the amplified response wave outputted from the amplifying unit by mixing the transmitted carrier wave and the amplified response wave outputted therefrom, wherein the amplifying unit comprises:

an input terminal operatively connected to the receiving unit;

an output terminal operatively connected to the synchronized-detection demodulator;

push-pull connected first and second transistors each of which has a charge carrier emitting region, a control region, and a charge carrier collection region, the charge carrier collection region being connected to the output terminal, the charge carrier emitting region being connected to the input terminal;

a first peak hold circuit having a first capacitor and a first diode and connected to the control region of the first transistor, the anode of the first diode being connected to the input terminal;

a first impedance element connected to between the input terminal and the anode of the first transistor;

a second peak hold circuit having a second capacitor and a second diode and connected to the control region of the second transistor, the cathode of the second diode being connected to the input terminal; and a second impedance element connected to between the input terminal and the cathode of the second transistor.

7. A noncontact information carrier according to claim 6, wherein the first impedance element is a third diode whose cathode is connected to the anode of the first diode and whose anode is connected to the input terminal, and the second impedance element is a fourth diode whose anode is connected to the cathode of the second diode and whose cathode is connected to the input terminal.

8. A noncontact information carrier reader according to claim 6, wherein the amplifying unit is configured to selectively attenuate the carrier wave components without reducing amplitudes of the response signal components.

* * * * *